United States Patent
Uchino

(10) Patent No.: US 7,017,033 B2
(45) Date of Patent: Mar. 21, 2006

(54) ARITHMETIC APPARATUS AND ARITHMETIC METHOD

(75) Inventor: Manabu Uchino, Chiba (JP)

(73) Assignee: Sony Corporation, (JP)

( * ) Notice: Subject to any disclaimer, the term of this patent is extended or adjusted under 35 U.S.C. 154(b) by 447 days.

(21) Appl. No.: 10/625,871

(22) Filed: Jul. 24, 2003

(65) Prior Publication Data

US 2004/0153485 A1    Aug. 5, 2004

(30) Foreign Application Priority Data

Aug. 2, 2002   (JP)   ............................... 2002-226604

(51) Int. Cl.
*G06F 9/40*   (2006.01)

(52) U.S. Cl. ........................................ 712/234; 712/34

(58) Field of Classification Search ................ 712/234, 712/15, 233, 239, 241, 34, 221; 708/490, 708/506, 508, 530

See application file for complete search history.

(56) References Cited

U.S. PATENT DOCUMENTS

| | | | | |
|---|---|---|---|---|
| 4,761,755 A | * | 8/1988 | Ardini et al. | 708/518 |
| 5,202,995 A | * | 4/1993 | O'Brien | 717/160 |
| 5,301,344 A | * | 4/1994 | Kolchinsky | 712/32 |
| 5,440,704 A | * | 8/1995 | Itomitsu et al. | 712/239 |
| 5,729,726 A | * | 3/1998 | Levine et al. | 712/233 |
| 5,729,757 A | * | 3/1998 | Shekels | 712/1 |
| 5,974,435 A | * | 10/1999 | Abbott | 708/523 |
| 6,032,252 A | * | 2/2000 | Petro et al. | 712/233 |
| 6,247,036 B1 | * | 6/2001 | Landers et al. | 708/603 |

* cited by examiner

*Primary Examiner*—Eric Coleman
(74) *Attorney, Agent, or Firm*—Rader, Fishman & Grauer, PLLC; Ronald P. Kananen

(57) ABSTRACT

An arithmetic apparatus and an arithmetic method capable of executing arithmetic by reconfigurable hardware, shortening the processing time of arithmetic including conditional branches causing a heavy processing load and improving the processing speed even when conditional branches exist in a loop of performing repeating arithmetic processing, wherein arithmetic processing including conditional branches is divided to first processing of unconditional branches and second processing with conditional branches, the first processing of unconditional branches is assigned to reconfigurable arithmetic means, configuration information of hardware is generated based on the first processing, the first processing is executed by the reconfigured arithmetic means based on the configuration information, the second processing with conditional branches is assigned to a CPU or other arithmetic means, the assigned second processing with conditional branches is executed by the CPU, and a result of the processing is used for correcting the result of said first processing, so that the result of arithmetic processing including conditional branches is obtained.

5 Claims, 7 Drawing Sheets

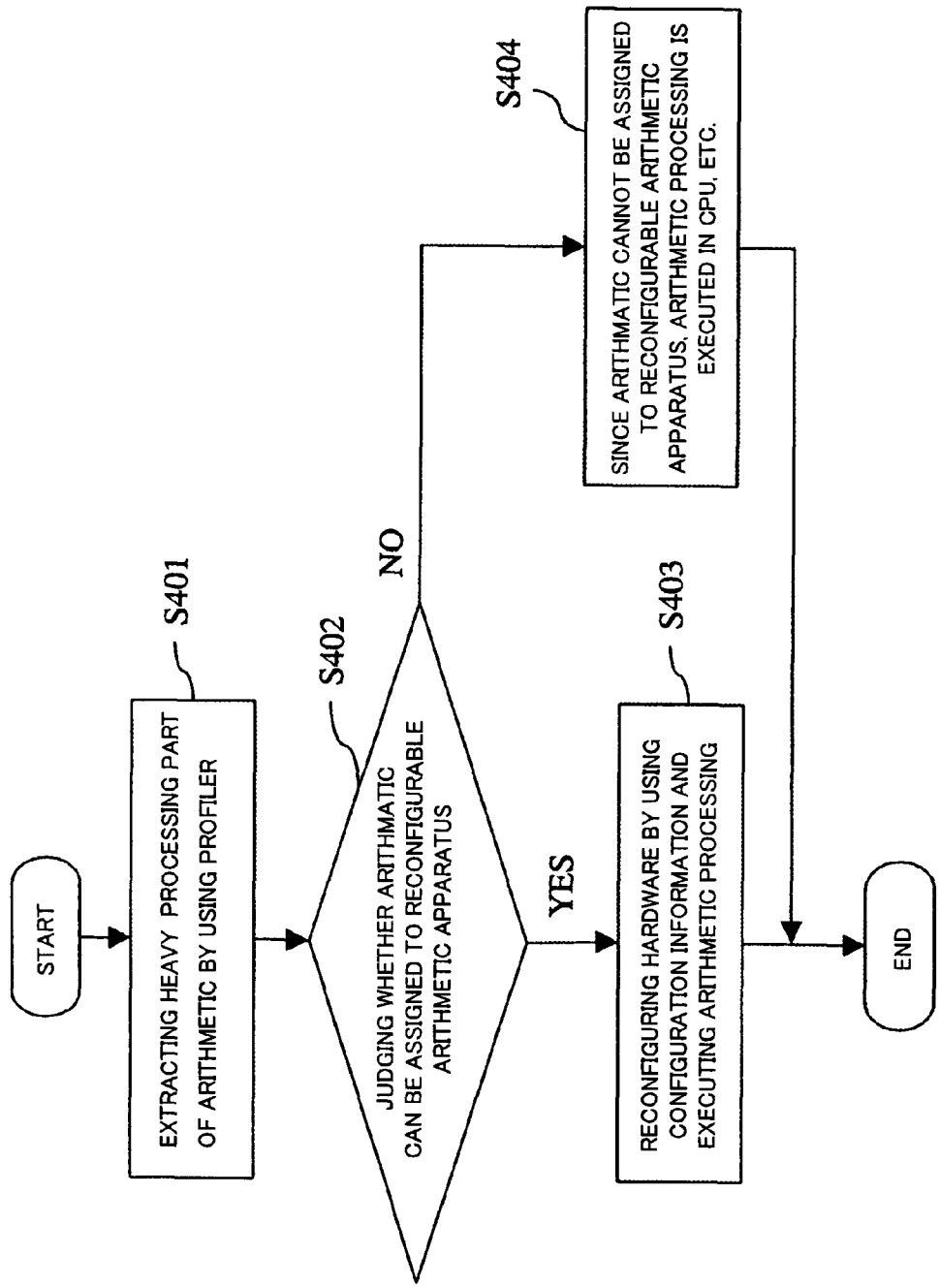

ARITHMETIC APPARATUS AND ARITHMETIC METHOD

BACKGROUND OF THE INVENTION

1. Field of the Invention

The present invention relates to an arithmetic apparatus and an arithmetic method for improving processing speed of conditional branch processing in an arithmetic apparatus comprising reconfigurable hardware.

2. Description of the Related Art

Audio and image signal processing includes a large number processing requiring a large amount of arithmetic operations, for example, repeating the processing of a product-sum operation, etc. When a CPU executes arithmetic processing causing a heavy processing load as such, the processing load on the CPU becomes heavy and processing speed declines. Thus, there has been proposed a processing method capable of realizing high-speed processing by reducing the processing load on the CPU by assigning this part of the arithmetic to a reconfigurable hardware.

FIG. 5 is a view of a configuration example of a reconfigurable arithmetic apparatus. As shown in FIG. 5, a reconfigurable arithmetic apparatus 30 comprises a configuration information memory 301, a data memory 302 and an arithmetic execution unit 303. Also, FIG. 5 shows a host CPU 10 and a shared memory 20 relating to the reconfigurable arithmetic apparatus 30.

The host CPU 10 provides configuration information and arithmetic data to the reconfigurable arithmetic apparatus 30 and receives arithmetic results from the reconfigurable arithmetic apparatus 30.

The shared memory 20 can be accessed by the host CPU 10 and is used for storing configuration information, arithmetic data and arithmetic results of the reconfigurable arithmetic apparatus.

In the reconfigurable arithmetic apparatus 30, the configuration information memory 301 stores configuration information input from the host CPU and provides the stored configuration information to the arithmetic execution unit 303.

The data memory 302 stores arithmetic data input from the host CPU 10 and provides the stored arithmetic data to the arithmetic execution unit 303. Also, the data memory 302 stores arithmetic results obtained in the arithmetic execution unit 303 and outputs the stored arithmetic results to the shared memory 20.

The arithmetic execution unit 303 comprises a plurality of arithmetic units, for example, an adder and a multiplier, etc. By reconfiguring these arithmetic units based on configuration information input from the configuration information unit 301, an arithmetic circuit for realizing new arithmetic functions corresponding to the configuration information is configured. Note that in FIG. 5, only three arithmetic units, which are an arithmetic unit 1, an arithmetic unit 2 and an arithmetic unit 3, are shown as examples in the arithmetic execution unit, but an actual arithmetic processing unit is composed of more arithmetic units. Also, it is possible to reconfigure by using only necessary ones among these arithmetic units in accordance with the configuration information.

FIG. 6 is a flowchart of the arithmetic processing of the above reconfigurable arithmetic apparatus. Below, an operation of the reconfigurable arithmetic apparatus will be explained with reference to FIG. 5 and FIG. 6.

First, the data memory 302 is initialized in accordance with need (step S301), and successively, the configuration information memory 301 is initialized in accordance with need (step S302).

Next, the data memory 302 reads arithmetic data from the host CPU 10, etc. (step S303). Then, the host CPU 10, etc. transmits configuration information to the configuration information memory 301 (step S304).

In the arithmetic execution unit, reconfiguration of hardware is performed based on the configuration information output from the configuration information memory 301 (step S305).

Next, arithmetic data are retrieved from the data memory 302 and arithmetic is executed in a hardware reconfigured based thereon (step S306).

After completing the arithmetic, an arithmetic result is transmitted to the data memory 302 and stored (step S307). Then, the arithmetic result is transmitted from the data memory 302 to the shared memory 20 (step S308).

Since a combination of hardware of the arithmetic execution unit is reconfigured based on the configuration information of the configuration information memory 301 by the above reconfigurable arithmetic apparatus, predetermined arithmetic can be executed at a high speed by the hardware. Therefore, when the host CPU 10 extracts arithmetic with a heavy processing load and generates configuration information based on a hardware configuration for realizing the arithmetic to provide to the reconfigurable arithmetic apparatus 30, the reconfigurable arithmetic apparatus 30 reconfigures the arithmetic execution unit 303 based on the configuration information and executes arithmetic at a high speed based on the arithmetic data provided from the host CPU 10, and the result is transmitted to the shared memory 20. As a result, the processing load on the host CPU 10 can be widely reduced, the processing time can be shortened, and high speed data processing can be easily realized.

Also, in the reconfigurable arithmetic execution unit 303, units for configuration changing are set broader than in an Field Programmable Gate Array (FPGA), etc., and it is configured to be able to deal with a variety of kinds of arithmetic by changing the configuration information and combining an adder, a multiplier, etc. By suitably assigning arithmetic of heavy processing for the host CPU 10, etc. to a reconfigurable arithmetic apparatus, the whole processing time can be shortened.

In the above reconfigurable arithmetic apparatus of the related art, however, it is not possible to perform arithmetic processing including conditional branches at a high speed.

FIG. 7 is a flowchart showing the assignment of conditional branch processing by using the reconfigurable arithmetic apparatus of the related art. As shown in the figure, extraction of a heavy part from arithmetic processing is performed by using a profiler in software first (step S401).

Next, it is judged whether a processing assignment of the heavy arithmetic part extracted by the profiler to the reconfigurable arithmetic apparatus is possible or not (step S402).

As a result of the above judgment, when processing assignment is possible, configuration information is prepared to reconfigure hardware and processing is assigned before executing arithmetic (step S403). By executing arithmetic in this state, arithmetic at a very high speed can be executed compared with software processing.

On the other hand, as a result of the judgment, when processing assignment is impossible, the arithmetic processing has to be performed in the host CPU 10, etc., so that the processing speed becomes slow compared with that in the case of the reconfigurable arithmetic apparatus.

Note that as the case where processing cannot be assigned to the above reconfigurable arithmetic apparatus, particularly, the case where there is a conditional branch in a repeating arithmetic in a software, etc. may be mentioned. In this case, it is reviewed whether the conditional branch can be taken out of the arithmetic or not at the stage of profiling, but it is algorithmically difficult in many cases.

SUMMARY OF THE IMVENTION

An object of the present invention is to provide an arithmetic apparatus and an arithmetic method capable of executing arithmetic by reconfigurable hardware, shortening the processing time of arithmetic causing a heavy processing load including a conditional branch and improving the processing speed even when a conditional branch exists in a loop for performing repeating arithmetic processing.

To attain the above object, according to the present invention, there is provided an arithmetic apparatus for executing arithmetic processing including conditional branches, comprising a configuration information generation means for dividing the arithmetic processing including conditional branches to first processing of unconditional branches and second processing with conditional branches and generating configuration information in accordance with the first processing of unconditional branches; a reconfigurable arithmetic means for reconfiguring based on the configuration information and executing the divided first processing of unconditional branches based on arithmetic data; and an arithmetic means for performing the divided second processing with conditional branches, and in accordance with a result of the processing, correcting an arithmetic result of the reconfigurable arithmetic means.

Also, in the present invention, preferably, said reconfigurable arithmetic means comprises a configuration information storing means for storing the configuration information; an arithmetic data storing means for storing the arithmetic data input from outside; and a plurality of arithmetic elements to be reconfigured based on the configuration information.

Also, in the present invention, preferably, the configuration information generation means comprises a dividing means for dividing the arithmetic processing so that the frequency of the first processing of unconditional branches becomes higher than the frequency of the second processing with conditional branches.

Also, according to the present invention, there is provided an arithmetic method for performing arithmetic processing including conditional branches, including: a dividing step for dividing the arithmetic processing including conditional branches to first processing of unconditional branches and second processing with conditional branches; a configuration information generation step for generating configuration information in accordance with the divided first processing of unconditional branches; a first arithmetic step for reconfiguring based on the configuration information and executing the divided first processing of unconditional branches based on arithmetic data; and a second arithmetic step for performing divided second processing with conditional branches and, in accordance with a result of the processing, correcting an arithmetic result of the first arithmetic step.

Furthermore, in the present invention, preferably, the arithmetic processing is divided in the dividing step so that the frequency of the first processing of unconditional branches becomes higher than the frequency of the second processing with conditional branches.

According to the present invention, arithmetic processing including conditional branches is divided to a first processing without any conditional branches and a second processing with conditional branches, the first processing of unconditional branches is assigned to a reconfigurable arithmetic means, configuration information of hardware is generated based on the first processing, arithmetic elements are reconfigured in the reconfigurable arithmetic means based on the configuration information, and desired arithmetic is executed based on arithmetic data. As a result, the first processing of unconditional branches can be executed at a high speed by the hardware.

The second processing with conditional branches is assigned to a fixed arithmetic means, such as a CPU, and the second processing with conditional branches assigned based on the conditional branches is executed in the CPU. By using a result of the second processing, a first processing result by the reconfigurable arithmetic means is corrected, and consequently, a result of arithmetic processing including conditional branches is obtained.

As explained above, according to the present invention, in the arithmetic means having reconfigurable hardware, when conditional branch processing is included in a repeating arithmetic processing, etc. causing a heavy processing load, a processing speed as a whole can be improved by preceding performing of processing by the hardware as processing without any conditional branches and correcting the arithmetic result by using an arithmetic result of processing of conditional branches. Particularly, when processing without a conditional branch is more frequently executed than processing including conditional branches, an effect of improving the processing speed becomes furthermore notable.

BRIEF DESCRIPTION OF DRAWINGS

FIG. 7 is a flowchart of processing including conditional branches in the arithmetic apparatus of the related art.

DESCRIPTION OF THE PREFERRED EMBODIMENT

Figure 1:
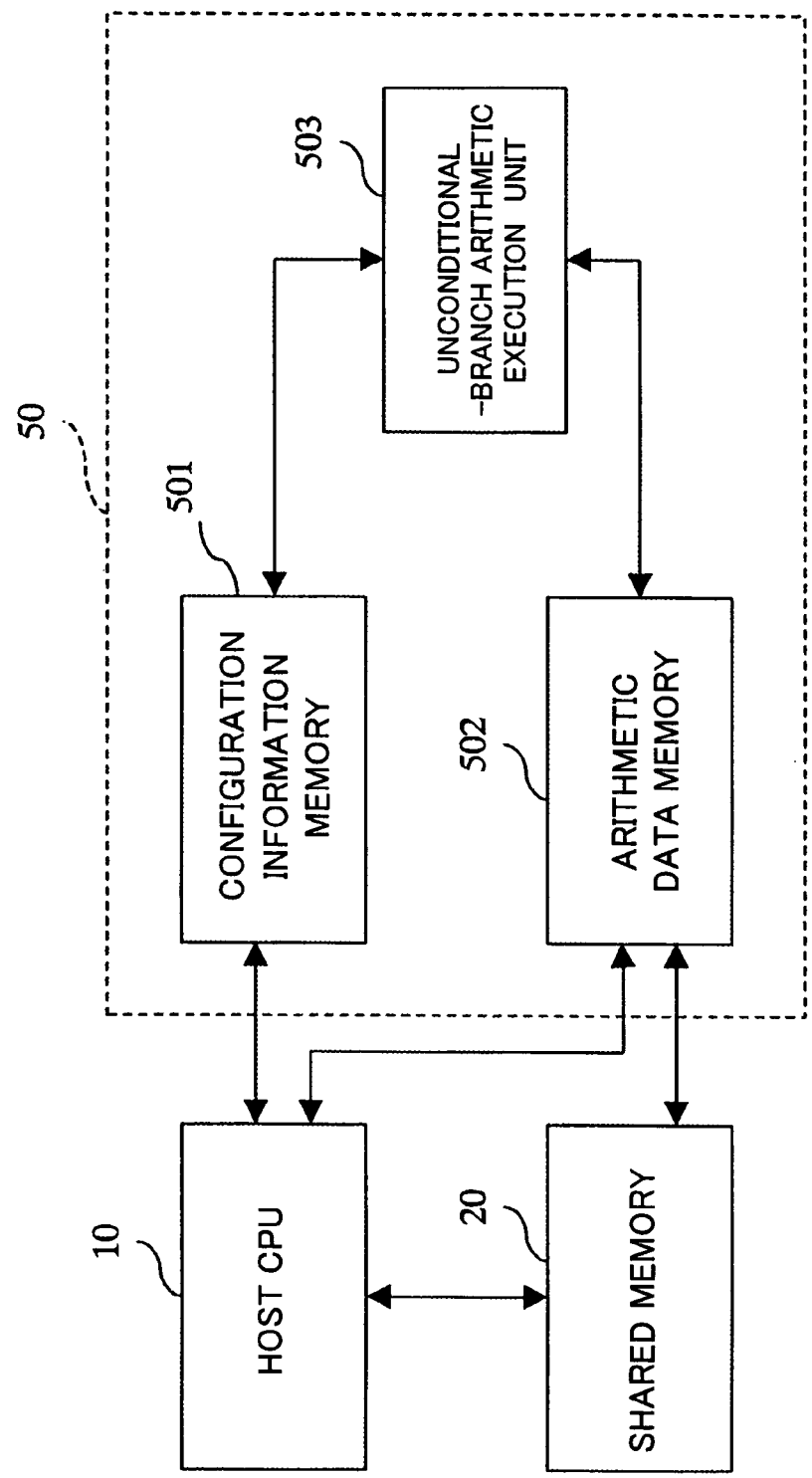
FIG. 1 is a view of the configuration of an embodiment of an arithmetic apparatus according to the present invention.

FIG. 1 is a circuit diagram of an embodiment of an arithmetic apparatus according to the present invention.

As shown in FIG. 1, the arithmetic apparatus of the present embodiment comprises a configuration information memory 501, an arithmetic data memory 502 and a reconfigurable arithmetic apparatus 50 including an unconditional-branch arithmetic execution unit 503. Also, a host CPU 10 and a shared memory 20 for providing configuration information and arithmetic data to the reconfigurable arithmetic apparatus 50 are provided.

The host CPU 10 provides configuration information of hardware and arithmetic data to the reconfigurable arithmetic apparatus 50. The configuration information is transmitted to the configuration information memory 501 of the reconfigurable arithmetic apparatus, and the arithmetic data is transmitted to the arithmetic data memory 502.

The shared memory 20 stores hardware configuration information and arithmetic data of the reconfigurable arithmetic apparatus 50. The hardware configuration information and the arithmetic data stored in the shared memory 20 are transmitted to the configuration information memory 501 and the arithmetic data memory 502 of the reconfigurable arithmetic apparatus 50 directly or via the host CPU 10 before performing arithmetic processing by the reconfigurable arithmetic apparatus 50.

In the reconfigurable arithmetic apparatus 50, the configuration information memory 501 stores hardware configuration information input from the host CPU 10, etc. and outputs the stored configuration information to the unconditional-branch arithmetic execution unit 502.

The arithmetic data memory 502 stores arithmetic data input from the host CPU 10, etc. and provides the stored arithmetic data to the unconditional-branch arithmetic execution unit 503. Also, a result of arithmetic processing by the unconditional-branch arithmetic execution unit 503 is transmitted to the arithmetic data memory 502, so that the arithmetic data memory 502 stores the arithmetic result input from the unconditional-branch arithmetic execution unit 503 and outputs it to the host CPU 10 and the shared memory 20.

In the reconfigurable arithmetic apparatus 50 of the present embodiment, when a repeating arithmetic processing includes a conditional branch, the arithmetic is performed regardless of the conditional branch, that is, assuming that there is no conditional branch. First, configuration information of the hardware stored in the configuration information memory 501 is transmitted to the unconditional-branch arithmetic execution unit 503, the hardware is reconfigured in the unconditional-branch arithmetic execution unit 503 based thereon, and predetermined arithmetic processing is assigned to the respective arithmetic units.

Then, in the unconditional-branch arithmetic execution unit 503, desired arithmetic processing is executed as processing of unconditional branches at a high speed based on the arithmetic data from the arithmetic data memory 502. After completing the arithmetic, the arithmetic result is transmitted to the arithmetic data memory 502. Next, the host CPU 10 receives the arithmetic result from the arithmetic data memory 502, performs branch processing in accordance with branching conditions and, by using the processing result, corrects the arithmetic result of the above unconditional-branch arithmetic execution unit 503. As a result of the correction based on all conditional branches, a result of arithmetic processing including the conditional branches is obtained.

Figure 2:
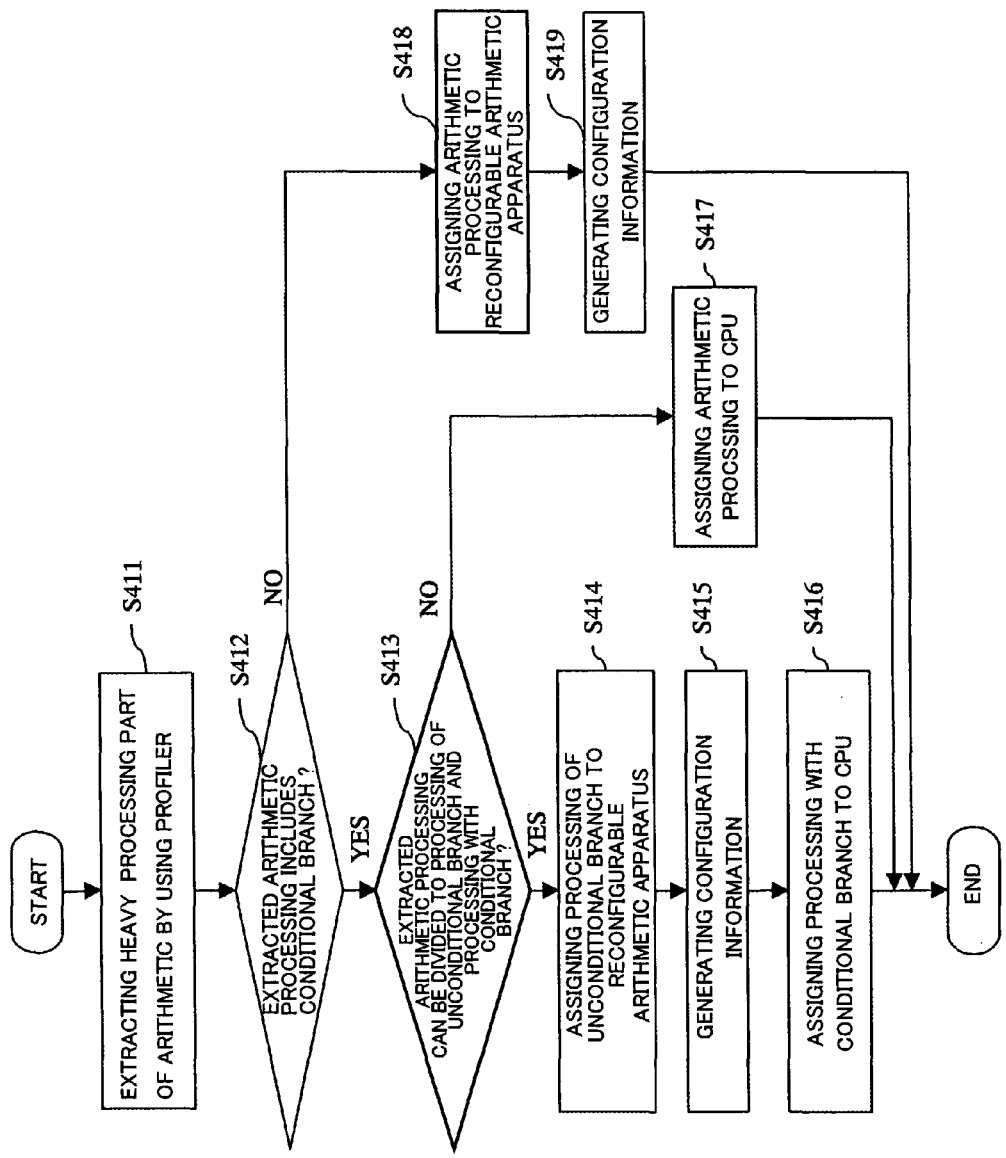
FIG. 2 is a flowchart of an assignment of arithmetic in the arithmetic apparatus according to the present embodiment.

FIG. 2 is a flowchart of assigning the arithmetic processing in the arithmetic apparatus of the present embodiment.

As shown in FIG. 2, extraction of a heavy processing part of arithmetic is performed by using a profiler (step S411). Namely, arithmetic causing a heavy processing load is extracted from arithmetic processing assigned to the arithmetic apparatus by a design tool of software, etc. Note that a size of the processing load can be judged, for example, by the number of processing steps required at the time of executing the processing in a CPU or other processor here.

Next, it is judged whether arithmetic with conditional branches is included or not in the extracted arithmetic causing a heavy processing load (step S412). As a result of the judgment, the procedure proceeds to a step S413 when arithmetic with conditional branches is included, while, when arithmetic with conditional branches is not included, it proceeds to a step S418. In the step S418, because there are not any conditional branches, the arithmetic processing is assigned to the reconfigurable arithmetic apparatus, and furthermore, configuration information of hardware for executing the assigned arithmetic is also generated (step S419).

In the step S413, it is judged whether the arithmetic including conditional branches can be divided to processing of unconditional branches and processing with conditional branches or not. As a result of the judgment, the procedure proceeds to a step S414 when it can be divided, while when it cannot be divided, it proceeds to a step S417, wherein all processing is assigned to the CPU because processing including conditional branches cannot be divided.

In the step S414, the arithmetic including conditional branches is divided to processing of unconditional branches and processing with conditional branches, and the processing of unconditional branches is assigned to the reconfigurable arithmetic apparatus. Also, configuration information of hardware in accordance with the assigned conditional branches is generated (step S415).

On the other hand, the processing with conditional branches is assigned to the CPU, etc. (step S416).

By assigning the processing as explained above, the arithmetic processing is divided in the case where conditional branches are included in the processing causing a heavy processing load. In the case where the conditional branch processing can be divided, the processing of unconditional branches is assigned to reconfigurable arithmetic apparatus, and the processing with conditional branches is assigned to the CPU, etc. Also, configuration information of hardware for executing the processing assigned to the reconfigurable arithmetic apparatus is generated. Due to this, in the reconfigurable arithmetic apparatus, hardware is reconfigured based on the configuration information and the assigned processing of unconditional branches can be performed at a high speed by the reconfigured hardware, so that a processing load on the CPU, etc. can be reduced. Particularly, when processing without a conditional branch is more frequently executed than processing including conditional branches, the effect of improving the processing speed becomes furthermore notable.

Therefore, in the above assigning of arithmetic processing, in the processing of unconditional branches and the processing with conditional branches, the more frequently executed processing is assigned to the reconfigurable arithmetic apparatus and the less frequently executed processing is assigned, for example, to the CPU, etc. Due to this, the effect of improving the processing speed can be further increased by using the reconfigurable hardware.

Next, arithmetic processing in the arithmetic apparatus of the present embodiment will be explained in accordance with configuration information, etc. generated by the above assigning processing.

Figure 3:
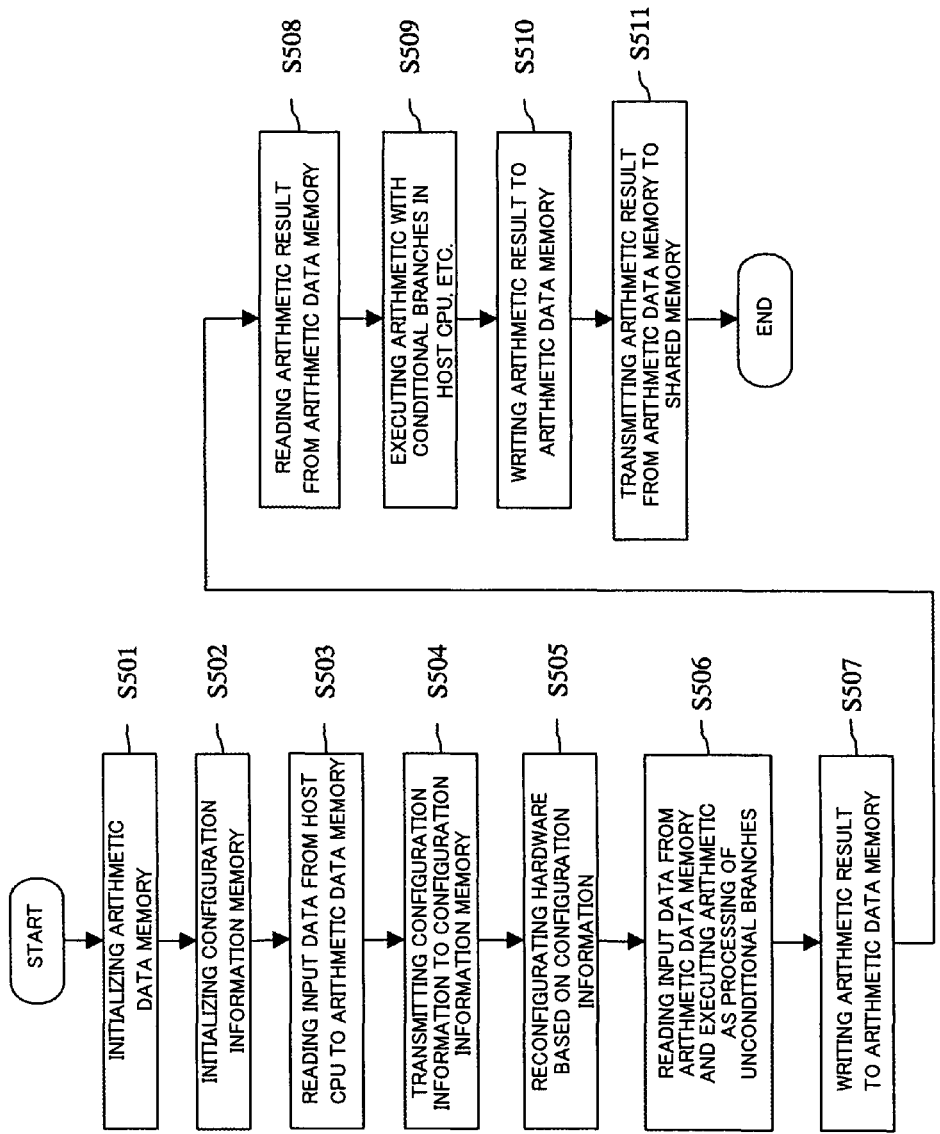
FIG. 3 is a flowchart of processing including conditional branches in the arithmetic apparatus according to the present embodiment.

FIG. 3 is a flowchart of arithmetic processing in the arithmetic apparatus of the present embodiment. Below, the arithmetic processing in the present embodiment will be explained with reference to FIG. 3 by following the order.

First, the arithmetic data memory is initialized in accordance with need (step S501) and the configuration information memory is initialized in accordance with need (step S502).

Next, arithmetic data is transmitted from the host CPU 10 and stored in the arithmetic data memory 502 (step S503).

Next, configuration information is transmitted from the host CPU 10, etc. and stored in the information memory 501 (step S504).

In the unconditional-branch arithmetic execution unit 503, hardware is reconfigured based on the configuration information input from the configuration information memory 501 (step S505). The hardware is reconfigured, for example, to execute predetermined arithmetic for the given number of times by ignoring all conditional branches in a predetermined repeating arithmetic.

The arithmetic data is read from the arithmetic data memory 502 and, based on the arithmetic data, predetermined arithmetic processing is executed by the reconfigured hardware in the unconditional-branch arithmetic execution unit 503 (step S506).

Then, the result of the arithmetic processing is written in the arithmetic data memory 502 (step S507).

Next, the arithmetic result is read from the arithmetic data memory 502 (step S508). The read arithmetic result is transmitted to the host CPU 10.

Then, the arithmetic processing with conditional branches is executed in the host CPU 10, etc. (step S509).

Next, the result of the arithmetic processing including conditional branches by the host CPU 10, etc. is output to the arithmetic data memory 502 and stored therein.

Then, the final arithmetic result stored in the arithmetic data memory 502 is output to the shared memory 20.

As explained above, in the arithmetic apparatus of the present embodiment, only execution of repeating arithmetic is preceded without executing conditional branches by the reconfigured hardware in the reconfigurable arithmetic apparatus, assuming that there is no conditional branches in the repeating arithmetic. Then, arithmetic including conditional branches is executed in the host CPU 10 and, by using the arithmetic result, the result of arithmetic executed without the conditional branches above is corrected. Accordingly, arithmetic without branches can be executed at a high speed by the reconfigurable hardware, so that a processing load on the host CPU 10 can be reduced and processing at a high speed can be realized. Particularly, after the preceding execution, in the arithmetic with conditional branches by the host CPU 10, etc., the less the frequency of data rewriting, the larger the effect of suppressing a processing amount becomes as a whole.

Next, one specific example of repeating arithmetic including conditional branches by using the arithmetic apparatus of the present embodiment will be explained.

Figure 4:
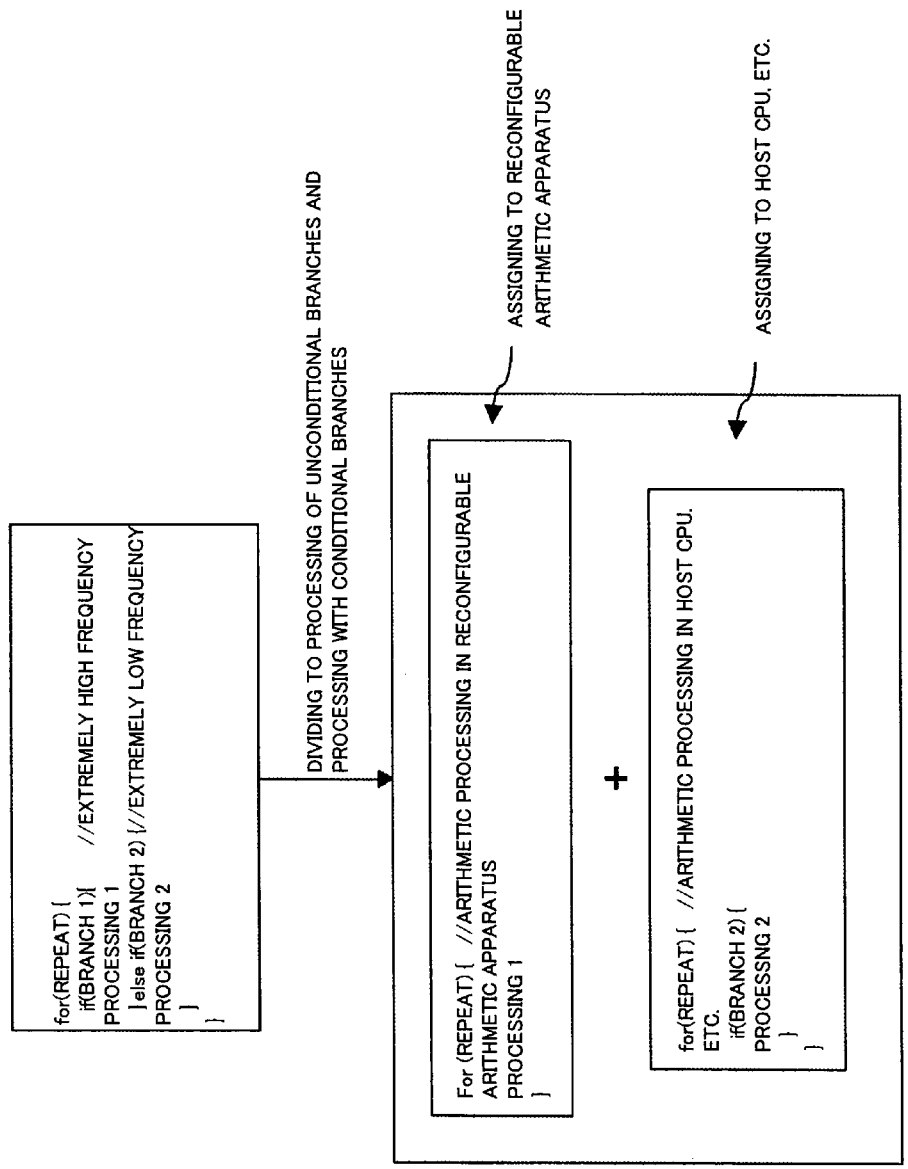
FIG. 4 is a view of an example of processing including conditional branches in the arithmetic apparatus according to the present embodiment.
Figure 5:
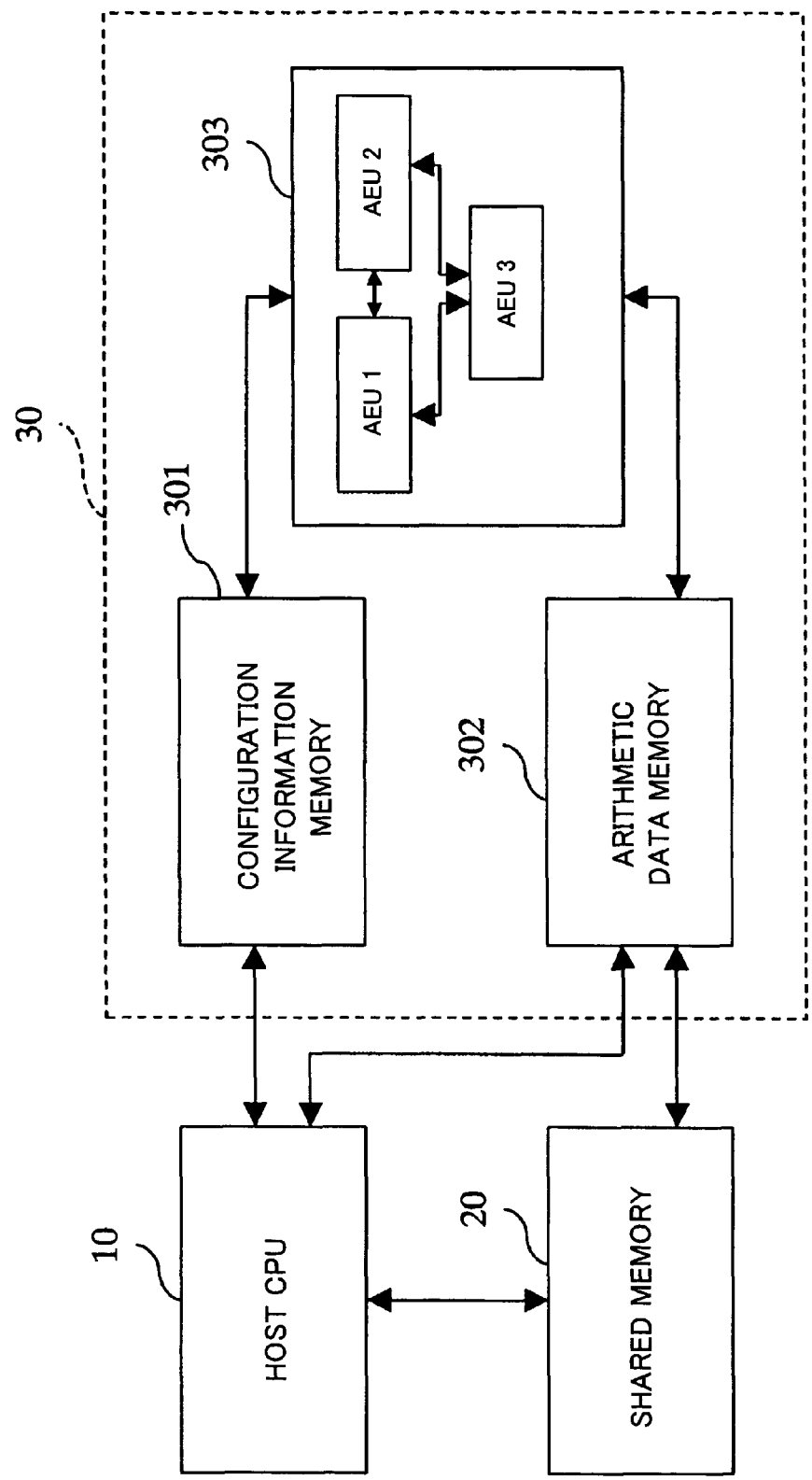
FIG. 5 is a view of the configuration of an example of a reconfigurable arithmetic apparatus of the related art.
Figure 6:
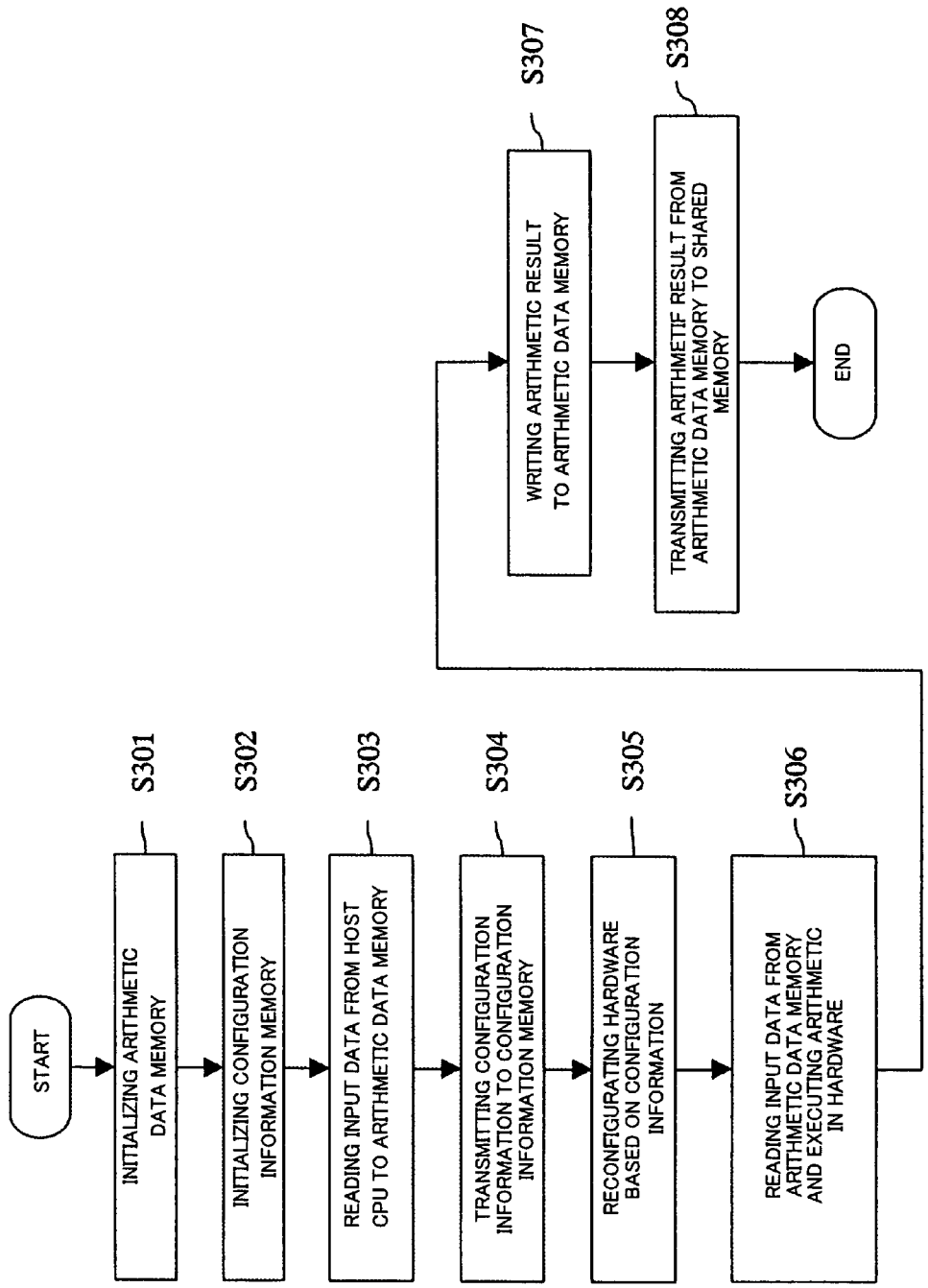
FIG. 6 is a flowchart of processing in the arithmetic apparatus of the related art.

FIG. 4 is a view of an example of repeating arithmetic processing including conditional branch processing. Note that, in FIG. 4, the repeating processing is expressed by a "for" sentence in a normal programming language. Also, conditional branch processing is expressed by an "if" sentence in the programming language, and a branching condition is expressed in brackets after the "if" sentence.

In the conditional branch processing shown in FIG. 4, for example, when a branching condition indicated by "branch 1" is satisfied, "processing 1" is executed, while when the branching condition indicated by the "branch 1" is not satisfied but a branching condition indicated by "branch 2" is satisfied, "processing 2" is executed.

Note that, as shown in FIG. 4, the branching condition "branch 1" is more frequently satisfied than the branching condition "branch 2". Namely, in the repeating loop shown in FIG. 4, the "processing 1" is more frequently executed than the "processing 2".

The above conditional branch processing is repeatedly executed as long as a predetermined repeating condition is satisfied.

As shown in FIG. 4, in the arithmetic apparatus of the present embodiment, the repeating arithmetic including the conditional branch processing as above is divided to two, which are arithmetic unconditional branches and arithmetic with conditional branches. First, repeating arithmetic including the "processing 1", which is highly frequently performed processing, is regarded as processing of unconditional branches, and arithmetic including the "processing 2", which is less frequently performed, is regarded as repeating arithmetic with conditional branches.

The repeating arithmetic considered to be unconditional branches, "processing 1" is executed by the reconfigurable arithmetic apparatus 50 of the present embodiment. Then, arithmetic of the less frequently performed "processing 2" is executed by the host CPU 10.

Namely, configuration information for reconfiguring hardware of the unconditional-branch arithmetic execution unit of the reconfigurable arithmetic apparatus 50 is generated in accordance with the arithmetic content of the "processing 1" by the host CPU 10. The configuration information is transmitted from the host CPU 10 to the configuration information memory 501 of the reconfigurable arithmetic apparatus, and based thereon, hardware is reconfigured in the unconditional-branch arithmetic execution unit 503. Then, based on arithmetic data input from the host CPU 10, etc., the "processing 1" is repeated as processing of unconditional branches and the arithmetic is executed at a high speed.

After executing the repeating arithmetic of the "processing 1", the "processing 2" is executed by following the branching condition "branch 2" of the "processing 2" by the host CPU, etc. By following the branching condition, a result of the repeating arithmetic of the "processing 1" of unconditional branches explained above is corrected by using the arithmetic result of the "processing 2" with the conditional branches. The corrected result is the result of repeating arithmetic including conditional branches.

In the above processing, when the frequency of "processing 1" is higher than that of the "processing 2", arithmetic of the "processing 1" can be executed at a high speed on the hardware by the reconfigurable arithmetic apparatus 50 by using the arithmetic apparatus of the present embodiment. Then, the "processing 2" with conditional branches is executed based on the branching condition by the host CPU 10, and the arithmetic result by the reconfigurable arithmetic apparatus 50 is corrected.

As explained above, according to the arithmetic apparatus and the arithmetic method of the present embodiment, repeating arithmetic including conditional branches is divided to two, which are arithmetic unconditional branches and arithmetic with conditional branches. Then, the arithmetic processing of unconditional branches is executed by a hardware reconfigured based on configuration information generated in accordance therewith. The arithmetic result is corrected by a result of the repeating arithmetic with conditional branches by the host CPU, etc. based on a branching condition. As a result, the processing load on the host CPU 10 can be reduced, the processing time can be made short, and the processing speed can be improved.

As explained above, according to the arithmetic apparatus and the arithmetic method of the present invention, a part causing a heavy processing load in arithmetic processing, such as repeating arithmetic, is preceded to be executed by hardware reconfigured based on configuration information, conditional branch processing is executed by the host CPU, and an arithmetic result by the hardware is corrected thereby, so that the processing load on the host CPU can be reduced, the processing time can be made short, and the processing speed can be improved. Therefore, when an appearance frequency of processing with conditional branches after finishing arithmetic by the hardware is low, the effect of improving the processing speed becomes particularly greater.

Also, according to the present invention, since arithmetic causing a heavy processing load can be executed at a high speed by the hardware, the amount of arithmetic can be reduced compared with arithmetic by a CPU, and consequently, the processing time can be made short, and the power consumption can be reduced.

Furthermore, according to the present invention, by assigning arithmetic causing a heavy processing load to the hardware, the processing load on the CPU is reduced and there is the advantage that other arithmetic processing can be performed during executing arithmetic in the hardware.

What is claimed is:

1. An arithmetic apparatus for executing arithmetic processing including conditional branches, comprising:
   a configuration information generation means for dividing said arithmetic processing including conditional branches to first processing of unconditional branches and second processing with conditional branches and generating configuration information in accordance with said first processing of unconditional branches;
   a reconfigurable arithmetic means for reconfiguring based on said configuration information and executing said divided first processing of unconditional branches based on arithmetic data; and
   an arithmetic means for performing said divided second processing with conditional branches, and in accordance with a result of the processing, correcting an arithmetic result of said reconfigurable arithmetic means.

2. An arithmetic apparatus as set forth in claim 1, wherein said reconfigurable arithmetic means comprises
   a configuration information storing means for storing said configuration information;
   an arithmetic data storing means for storing said arithmetic data input from outside; and
   a plurality of arithmetic elements to be reconfigured based on said configuration information.

3. An arithmetic apparatus as set forth in claim 1, wherein said configuration information generation means comprises a dividing means for dividing said arithmetic processing so that a frequency of said first processing of unconditional branches becomes higher than a frequency of said second processing with conditional branches.

4. An arithmetic method for performing arithmetic processing including conditional branches, including:
   a dividing step for dividing said arithmetic processing including conditional branches to first processing of unconditional branches and second processing with conditional branches;
   a configuration information generation step for generating configuration information in accordance with said divided first processing of unconditional branches;
   a first arithmetic step for reconfiguring based on said configuration information and executing said divided first processing of unconditional branches based on arithmetic data; and
   a second arithmetic step for performing divided second processing with conditional branches and, in accordance with a result of the processing, correcting an arithmetic result of said first arithmetic step.

5. An arithmetic method as set forth in claim 4, wherein said arithmetic processing is divided in said dividing step so that a frequency of said first processing of unconditional branches becomes higher than a frequency of said second processing with conditional branches.

* * * * *